US010246110B2

(12) United States Patent
Xu et al.

(10) Patent No.: US 10,246,110 B2
(45) Date of Patent: Apr. 2, 2019

(54) HEAVY FREIGHT TRAIN MARSHALLING DEVICE AND MARSHALLING METHOD, AND ELECTRONICALLY CONTROLLED PNEUMATIC BRAKE SYSTEM

(71) Applicant: CRRC QINGDAO SIFANG ROLLING STOCK RESEARCH INSTITUTE CO., LTD., Qingdao (CN)

(72) Inventors: Yanfen Xu, Qingdao (CN); Shengcai Duan, Qingdao (CN); Jing Zhao, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 0 days.

(21) Appl. No.: 15/912,534

(22) Filed: Mar. 5, 2018

(65) Prior Publication Data
US 2018/0194378 A1 Jul. 12, 2018

Related U.S. Application Data

(63) Continuation of application No. PCT/CN2016/109558, filed on Dec. 13, 2016.

(30) Foreign Application Priority Data

Oct. 20, 2016 (CN) .......................... 2016 1 0915491

(51) Int. Cl.
*B61L 15/00* (2006.01)
*B60T 13/74* (2006.01)
(Continued)

(52) U.S. Cl.
CPC .......... *B61L 15/0018* (2013.01); *B60T 13/74* (2013.01); *B61L 3/08* (2013.01); *B61L 15/0027* (2013.01);
(Continued)

(58) Field of Classification Search
CPC .. B61L 2205/04; B61L 25/025; B61L 25/028; B61L 15/028; B61L 15/00; H04W 88/02; H04W 92/10
(Continued)

(56) References Cited

U.S. PATENT DOCUMENTS 5,682,139 A * 10/1997 Pradeep ................ B61L 25/021
340/10.31
5,691,980 A * 11/1997 Welles, II ............. B61L 25/021
370/316
(Continued)

FOREIGN PATENT DOCUMENTS

CN 101022985 A 8/2007
CN 104442901 A 3/2015
(Continued)

OTHER PUBLICATIONS

The International Search Report of corresponding International PCT Application No. PCT/CN2016/109558, dated Jun. 28, 2017.
(Continued)

*Primary Examiner* — Zachary L Kuhfuss
(74) *Attorney, Agent, or Firm* — J.C. Patents

(57) ABSTRACT

The present invention relates to a heavy freight train marshalling device and marshalling method, and an electronically controlled pneumatic brake system; the latitude and longitude data of the carriage control unit is acquired by a Beidou positioning module; the first-vehicle state data of the carriage control unit is acquired by detecting a first-vehicle identification terminal; and, the carriage control units only
(Continued)

need to transmit the acquired location data and the first-vehicle state data to the HEU via communication modules. Accordingly, the number of communication messages between the carriage control units and the HEU is decreased, the complicated process of connecting the carriage control units to or disconnecting the carriage control units from a switchable load is omitted, the marshalling time is shortened, and the complexity of marshalling is reduced.

13 Claims, 5 Drawing Sheets

(51) Int. Cl.
  *B61L 3/08* (2006.01)
  *H04W 88/02* (2009.01)
  *H04W 92/10* (2009.01)
  *B61L 25/02* (2006.01)

(52) U.S. Cl.
  CPC ....... *B61L 15/0036* (2013.01); *B61L 15/0054* (2013.01); *B61L 25/025* (2013.01); *B61L 25/028* (2013.01); *H04W 88/02* (2013.01); *H04W 92/10* (2013.01); *B61L 2205/02* (2013.01); *B61L 2205/04* (2013.01)

(58) Field of Classification Search
  USPC .......................................... 701/19; 246/122 R
  See application file for complete search history.

(56) References Cited

U.S. PATENT DOCUMENTS

| | | | | |
|---|---|---|---|---|
| 6,144,900 | A | 11/2000 | Ali et al. .......................... 701/19 |
| 6,421,587 | B2* | 7/2002 | Diana .................... B61L 25/023 |
| | | | | 246/122 R |
| 6,456,937 | B1* | 9/2002 | Doner ................. B61L 15/0027 |
| | | | | 246/122 R |
| 6,490,523 | B2* | 12/2002 | Doner ................. B61L 15/0027 |
| | | | | 246/1 R |
| 7,222,003 | B2* | 5/2007 | Stull .................... B61L 15/0027 |
| | | | | 701/19 |
| 8,589,001 | B2* | 11/2013 | Siddappa ................ B61C 17/12 |
| | | | | 455/92 |
| 8,954,209 | B2* | 2/2015 | Burnett .................... B61C 17/12 |
| | | | | 701/19 |
| 9,711,046 | B2* | 7/2017 | Shubs, Jr. ................ G08G 1/13 |
| 2001/0044681 | A1* | 11/2001 | Diana .................... B61L 25/023 |
| | | | | 701/19 |
| 2003/0183697 | A1* | 10/2003 | Porter ...................... B61L 3/125 |
| | | | | 235/492 |
| 2005/0102071 | A1 | 5/2005 | Lapointe .......................... 701/19 |
| 2012/0245766 | A1* | 9/2012 | Cooper .................. B61C 17/12 |
| | | | | 701/2 |
| 2016/0144875 | A1* | 5/2016 | Kim, II ................. B61L 25/026 |
| | | | | 370/328 |
| 2016/0244078 | A1* | 8/2016 | Noffsinger ............ B61L 23/044 |
| 2016/0272228 | A1* | 9/2016 | LeFebvre ............ B61L 15/0027 |
| 2016/0311450 | A1* | 10/2016 | Roberts .................... B61L 23/00 |
| 2016/0339929 | A1* | 11/2016 | Schoenly ................ B61L 3/006 |
| 2017/0021847 | A1* | 1/2017 | LeFebvre ............ B61L 15/0027 |
| 2017/0151970 | A1* | 6/2017 | Shubs, Jr. ........... B61L 27/0094 |
| 2017/0349194 | A1* | 12/2017 | Chung ................. B61L 25/025 |
| 2018/0093685 | A1* | 4/2018 | Chung ................. B61L 25/025 |
| 2018/0170415 | A1* | 6/2018 | Oswald ................. B61L 25/025 |
| 2018/0237042 | A1* | 8/2018 | Angel ..................... B61L 25/02 |

FOREIGN PATENT DOCUMENTS

| | | |
|---|---|---|
| CN | 104554280 A | 4/2015 |
| CN | 105539456 A | 5/2016 |
| EP | 0 747 726 A2 | 12/1996 |
| JP | H04-303062 A | 10/1992 |
| JP | H05-015012 A | 1/1993 |
| JP | H09-074618 A | 3/1997 |
| JP | P3150142 B2 | 1/2001 |
| JP | 2005-261095 A | 9/2005 |
| JP | 2008-37270 A | 2/2008 |
| JP | 2010-207088 A | 9/2010 |
| JP | 2010-284032 A | 12/2010 |
| JP | 2014-217088 A | 11/2014 |
| RU | 2 460 653 C2 | 9/2012 |
| WO | WO 2015/081278 A1 | 6/2015 |

OTHER PUBLICATIONS

The Japanese Examination Report of corresponding Japan patent application No. 2018-523803, dated Nov. 20, 2018.
The Russian Federation Search Report of corresponding Russian patent application No. 2018109572/11(014797), dated Jul. 12, 2018.

* cited by examiner

HEAVY FREIGHT TRAIN MARSHALLING DEVICE AND MARSHALLING METHOD, AND ELECTRONICALLY CONTROLLED PNEUMATIC BRAKE SYSTEM

CROSS-REFERENCE TO RELATED APPLICATION

This application is a continuation application of, and claims the priority benefit of International Application No. PCT/CN2016/109558, filed on Dec. 13, 2016, which in turn claims the priority benefits of China patent application No. 201610915491.1, filed on Oct. 20, 2016. The contents of the above identified applications are hereby incorporated by reference in its entirety.

TECHNICAL FIELD

The present invention belongs to the technical field of railway vehicles, and relates to train marshalling technologies, in particular to a heavy freight train marshalling device and marshalling method, and an electronically controlled pneumatic brake system, which are mainly applied to the marshalling of heavy freight trains.

BACKGROUND OF THE PRESENT INVENTION

The heavy load transportation is a development direction of the rail freight. At present, the heavy load mode for trains is mainly developed by the following two approaches.

(1) Increasing the axle load. However, the increase of the axle load will have influences on the operation lines of trains and bridges by which trains pass, so that the investment in the railway infrastructure construction and the maintenance cost are high.

(2) Increasing the marshalling length. This approach has the following advantages: increasing the marshalling length is simple and feasible, the existing railway equipment can be fully utilized, and the operation lines of trains and the bridges by which trains pass will not be influenced. However, the approach of increasing the marshalling length still has obvious disadvantages. The increase of the train marshalling length will increase the longitudinal impulse of trains, so that the probability of occurrence of broken coupler and derailment accidents of trains will be increased and the transportation safety of trains is thus influenced. Since the longitudinal impulse of a long marshalled train is mainly caused by "asynchronism" of front and rear portions of a train resulted from the transmission of pneumatic braking and slow-release commands via the change in train pipe pressure, this problem will become more and more serious as the marshalling length of the train, so that the transportation safety is threatened seriously and the development of heavy load transportation is restricted.

Nowadays, for a railway wagon, synchronous braking and slow-release of the whole train are realized by an electronically controlled pneumatic brake system (referred to as an ECP system hereinafter). The ECP system needs to acquire the accurate location of carriage units, and then performs accurate control and failure analysis, thereby improving the operability and safety of the train.

At present, the ECP system acquires marshalling information of the train in a manner of being connected to a switchable load to count the number of pulses. However, in this way, the marshalling time is long, the marshalling process is complicated, and the like.

An existing train marshalling device includes a Head End Unit (HEU), a telecom power system (TPS), a tail end unit, a carriage control unit, a switchable load and a current sensor for detecting the current of a carriage control power supply. The marshalling process is as follows:

1. the HEU transmits a marshalling instruction to all carriages of the train, and all carriages begin to count the number of pulses;

2. for each carriage (i) (where i=1, . . . , the serial number of a tail end carriage database), (1) the HEU detects whether the carriage (i) is connected to a load;

(2) the HEU receives information indicating that the carriage (i) has been connected to the load;

(3) the carriage control unit detects the current of a train bus by the current sensor, and the number of pulses is added by 1 if there is pulse current; and (4) the HEU receives information indicating that the carriage (i) has been disconnected from the load; and 3. the HEU transmits a marshalling stop instruction to all carriages of the train, and all carriages stop counting the number of pulses.

For example, with reference to the sample train marshalling device shown in FIG. 1, this train has four carriages, and the HEU repetitively performs the train scheduling process four times. During each repetition, only one carriage connects a load to the train bus to detect the presence or absence of current in each carriage and count the number of current detections. The information about the presence or absence of current and the number of current detections is stored in a "pulse counter" of each carriage. The number of pulses of the train refers to Table 1. The actual location of each carriage is based on the value of the "pulse counter" and the total number of marshalled carriages of the train.

TABLE 1

| Load Connected | Iteration | | | |
| --- | --- | --- | --- | --- |
| | I1/V1 | I2/V2 | I3/V3 | I4/V4 |
| L4 | Present (1) | Present (1) | Present (1) | Note 1 |
| L3 | Present (1) | Present (1) | Note 1 | Absent (0) |
| L2 | Present (1) | Note 1 | Absent (0) | Absent (0) |
| L1 | Note 1 | Absent (0) | Absent (0) | Absent (0) |
| Pulse Count | 3 | 2 | 1 | 0 |
| Location (the total carriage number-pulse number | 1 | 2 | 3 | 4 |

In Table 1, "Note 1" indicates that the number of pulses is not updated in the carriage connected to the load.

The train marshalling approach can be completed by using the existing train bus on the train, but power supply switchover needs to be performed to the train bus, and the connection to the switchable load and the disconnection from the switchable load need to be performed in each carriage of the train. Therefore, the carriage marshalling process is complicated and requires long time.

SUMMARY OF THE PRESENT INVENTION

In view of the problems of complicated marshalling process, long marshalling time and the like during marshalling an existing railway freight train, the present application provides a heavy freight train marshalling device and marshalling device, and an electronically controlled pneumatic brake system, which realize simple and rapid train marshalling, and during marshalling of a railway freight train, can shorten the marshalling time of the train, reduce the complexity of train marshalling, decrease the failure rate of train marshalling and improve the reliability of train marshalling.

For this purpose, the present application provides a heavy freight train marshalling device, comprises a Head End Unit (HEU) and a plurality of carriage control units, wherein the HEU is communicated with each of the carriage control units; each carriage control unit comprises a carriage control module, and a Beidou positioning module and a communication module respectively connected with the carriage control module; a first-vehicle identification terminal is further provided in the carriage control unit working as the first vehicle; the carriage control module acquires first-vehicle state data via the first-vehicle identification terminal; the Beidou positioning module is configured to acquire latitude and longitude data of the corresponding carriage control unit; and, the carriage control mode receives, via the communication module, a command transmitted by the HEU, and transmits, to the HEU and via the communication module, the latitude and longitude data of the carriage control unit read from the Beidou positioning module and the first-vehicle state data of the carriage control unit.

As a further design of the train marshalling device of the present application, a calculation module for calculating the distance between the carriage control units is provided in the HEU. The calculation module realizes its calculation function by software programming, and calculates the distance between the carriage control units by using the acquired latitude and longitude data of each carriage control unit. More specifically, during the calculation of the distance between any two carriage control units, different calculation formulae can be used for calculation. The calculation formulae include, but not limited to, the following formula: $D=R*\arccos(\sin y1 \sin y2+\cos y1 \cos y2 \cos(x1-x2))$, where R is the radius of the earth and has a mean value of 6370 km; the longitude and latitude of one carriage control unit are denoted by x1 and y1, respectively, and the longitude and latitude of the other carriage control unit are denoted by x2 and y2, respectively; and, the east longitude is a positive value, the west longitude is a negative value, the north latitude is a positive value, and the south latitude is a negative value. The distance between two carriage control units can be calculated by this formula. Since the longitude and the latitude are angles, during the calculation of the value of sin or cos, the longitude and the latitude should be converted into radians.

As a preferred design of the train marshalling device of the present application, the HEU comprises a marshalling processor and a communication module connected to the marshalling processor. The marshalling processor transmits a command to the carriage control module of each carriage control unit respectively, via the communication module. Upon receiving the command, the carriage control module reads the latitude and longitude data of the carriage control unit acquired by the Beidou positioning module, and transmits, to the marshalling processor and via the communication module, the read latitude and longitude data of the carriage control unit and the first-vehicle state data of the carriage control unit.

As a preferred design of the train marshalling device of the present application, the calculation module is provided within the marshalling processor, and is configured to calculate the distance between each carriage control unit after the marshalling processor receives the latitude and longitude data and the first-vehicle state data of each carriage control unit.

As a preferred design of the train marshalling device of the present application, the marshalling processor transmits a marshalling command to the carriage control module of each carriage control unit via the communication module.

As a preferred design of the train marshalling device of the present application, wireless communication or wired communication is employed between the communication module of the HEU and the communication module of each carriage control unit, and wireless communication or wired communication is employed between the communication modules of the carriage control units.

For this purpose, the present application further provides a heavy freight train marshalling method, which realizes marshalling by the heavy freight train marshalling device and comprises the following steps of:

(1) recording the total number of carriage control units as M, the first-vehicle state of a carriage control unit as the first vehicle as TRUE, and the first-vehicle state of the remaining carriage control units as NULL;

(2) transmitting, by a Head End Unit (HEU), marshalling commands to all carriage control units via a communication unit, and switching the HEU to a train marshalling mode;

(3) responding to, for a carriage control module of each carriage control unit, the marshalling command; acquiring, by a Beidou positioning module, latitude and longitude data of the carriage control unit, and acquiring, by detecting a first-vehicle identification terminal, first-vehicle state data of the carriage control unit;

(4) transmitting, by the M carriage control units, the latitude and longitude data and the first-vehicle state data of the M carriage control units to the HEU via the communication modules, forming an array A[M];

(5) traversing, by the HEU, the array A[M] to search a carriage control unit a[i] the first-vehicle state of which is TRUE, recording the location of the carriage control unit a[i] the first-vehicle state of which is TRUE as Location=1, taking out the carriage control unit a[i] from the array A[M] and storing it as FirstUnit, deleting the carriage control unit a[i] from the array A[M], rearranging to obtain an array A[M−1] which is denoted as BaseOrder;

(6) using the FirstUnit as a starting point, calculating the distance from the FirstUnit to each carriage control unit in the BaseOrder to find a carriage control unit a[j] having a minimum distance from the starting point, and recording a location of the carriage control unit a[j] as Location=Location+1;

(7) using the carriage control unit as a new FirstUnit, and deleting the carriage control unit a[j] from the BaseOrder; and (8) repeating the operations in the steps (6) and (7) to successively determine the location of the remaining M−2 carriage control units until the BaseOrder is empty, so that the marshalling of the heavy freight train is completed.

As a preferred design of the train marshalling method of the present application, the obtained distance from the FirstUnit to each carriage control unit in the BaseOrder forms a distance set, and the carriage control unit having the minimum distance from the starting point is searched from the distance set.

For this purpose, the present application further provides an electronically controlled pneumatic brake system, comprising a leading locomotive and a plurality of carriage units, wherein each carriage unit consists of at least one carriage; the electronically controlled pneumatic brake system further comprises a heavy freight train marshalling device; and, the HEU is provided within the leading locomotive, and the carriage control units are provided within the carriage units.

As a preferred design of the electronically controlled pneumatic brake system of the present application, each carriage unit consists of five carriages.

Compared with the prior art, the present application has the following advantages and positive effects.

(1) The heavy freight train marshalling device provided by the present application includes carriage control units in which Beidou positioning modules are provided, so that the latitude and longitude data (i.e., location data) of each carriage control unit is acquired by Beidou positioning; moreover, a first-vehicle identification terminal is provided in a carriage control unit working as the first vehicle, and the HEU acquires first-vehicle state data by detecting the first-vehicle identification terminal; and, the carriage control units only need to transmit the acquired location data and the first-vehicle state data to the HEU via communication modules. Accordingly, the number of communication messages between the carriage control units and the HEU is decreased, the complicated process of connecting the carriage control units to or disconnecting the carriage control units from a switchable load is omitted, the marshalling time is shortened, and the complexity of marshalling is reduced.

(2) In the heavy freight train marshalling device provided by the present application, the power supply control system and the switchable load are omitted, it is not required to perform power supply switchover and the connection or disconnection of the switchable load, and the number of failure points is decreased, so that the failure rate of train marshalling is reduced and the reliability of train marshalling is improved.

(3) In the heavy freight train marshalling device provided by the present application, the communication modules may employ wireless communication or wired communication, so that it is convenient to use, the range of application is wide, the dependence of the heavy freight train marshalling device on the train buses and cables is reduced, and the communication mode of a heavy freight train is enriched.

(4) In the heavy freight train marshalling method provided by the present application, location data and first-vehicle state data of each carriage control unit are respectively acquired by Beidou positioning and by detecting a first-vehicle identification terminal to form an array for the carriage control unit. The HEU traverses the whole array to find a carriage control unit in the first-vehicle state of TRUE, and the location of the carriage control unit in the first-vehicle state of TRUE is recorded as 1. By calculating the distance from the carriage control unit at the location 1 to each of the remaining carriage control units, a carriage control unit having the minimum distance from the carriage control unit at the location 1 is found and the location of this carriage control unit is recorded as 2. In this way, the locations of all the remaining carriage control units are acquired successively, and the train marshalling is completed. Accordingly, the complication process of connecting each carriage control unit to or disconnecting each carriage control unit from a switchable load is omitted. The train marshalling process is simplified, and the controllability and safety of train operation are improved.

(5) In the heavy freight train marshalling method provided by the present application, due to low requirements for the power supply of the train, the complexity of the system can be reduced, and the stability of the train system can be improved.

(6) In the electronically controlled pneumatic brake system provided by the present application, on the basis of realizing synchronous braking and slow-releasing, since the electronically controlled pneumatic brake system includes a heavy freight train marshalling device and the heavy freight train marshalling device acquires marshalling information of carriage control units by Beidou positioning and by detecting a first-vehicle identification terminal, the accurate location of the carriage control units can be acquired, accurate control and failure analysis can be performed, and the operability and safety of train operation can be improved. Meanwhile, during marshalling, since the heavy freight train marshalling device does not perform the switchover of a power supply and the connection to or disconnection from a switchable load, the marshalling time is shortened, the complexity of marshalling is reduced, and the problems of long marshalling time and complicated marshalling process in the prior art are solved.

DETAILED DESCRIPTION OF THE PRESENT INVENTION

The present application will be specifically described below by exemplary implementations. However, it should be understood that, without further statement, elements, structures and features in one implementation can be advantageously integrated into other implementations. In addition, the terms "first", "second", "third", "fourth", "fifth" and "eleventh" are merely descriptive, and cannot be interpreted as relative importance of an indication or implication.

Embodiment 1

Figure 1:
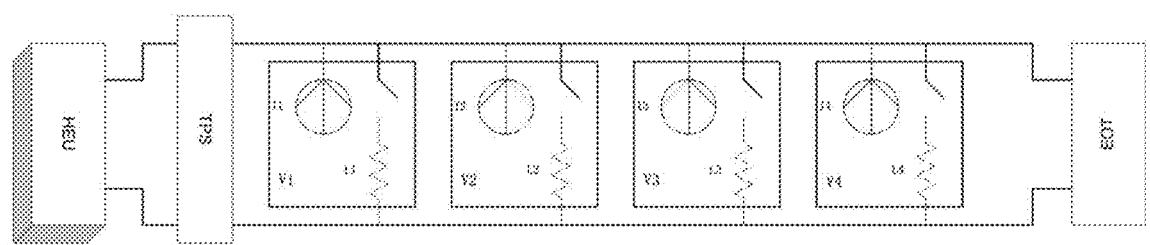
FIG. 1 is a structural diagram of a prior train marshalling device.
Figure 2:
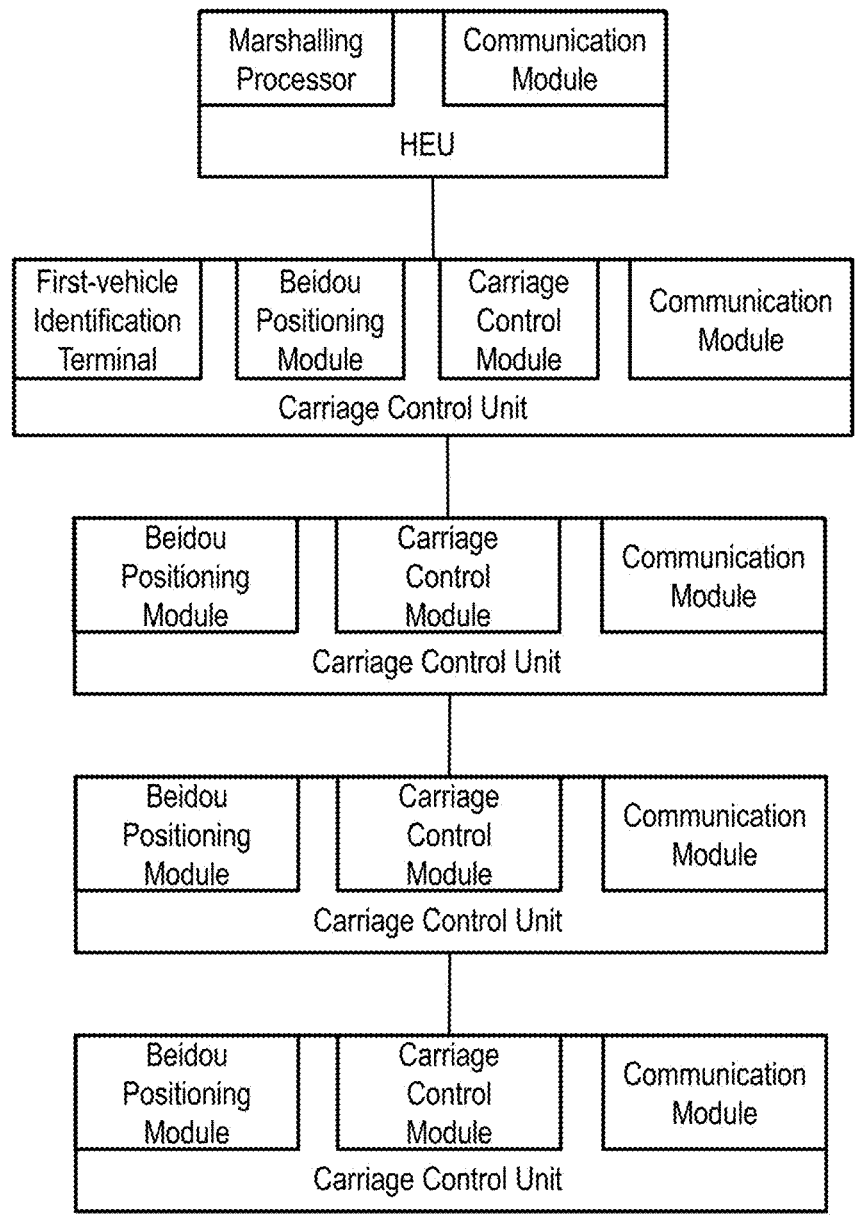
FIG. 2 is a structural diagram of a heavy freight train marshalling device according to Embodiment 1 of the present application.

Referring to FIG. 2, this embodiment provides a heavy freight train marshalling device, comprising a Head End Unit (HEU) and four carriage control units. The HEU is communicated with each of the carriage control units, and each of the carriage control units comprises a carriage control module, a Beidou positioning module and a communication module. The four carriage control units are a first carriage control unit, a second carriage control unit, a third carriage control unit and a fourth carriage control unit, respectively. The first carriage control unit comprises a first carriage control module, and a first Beidou positioning module and a first communication module which are both connected to the first carriage control module. The first Beidou positioning module is configured to acquire latitude and longitude data of the first carriage control unit. The second carriage control unit comprises a second carriage control module, and a second Beidou positioning module and a second communication module which are both connected to the second carriage control module. The second Beidou positioning module is configured to acquire latitude and longitude data of the second carriage control unit. The third carriage control unit comprises a third carriage control module, and a third Beidou positioning module and a third communication module which are both connected to the third carriage control module. The third Beidou positioning module is configured to acquire latitude and longitude data of the third carriage control unit. The fourth carriage control unit comprises a fourth carriage control module, and a fourth Beidou positioning module and a fourth communication module which are both connected to the fourth carriage control module. The fourth Beidou positioning module is configured to acquire latitude and longitude data of the fourth carriage control unit. Among the four carriage control units, only one carriage control unit is used as a first vehicle. The first vehicle may be any one of the first carriage control unit, the second carriage control unit, the third carriage control unit and the fourth carriage control unit. A first-vehicle identification terminal is further provided in the carriage control unit as the first vehicle. The carriage control module of each carriage control unit acquires first-vehicle state data by detecting the first-vehicle identification terminal.

Referring to FIG. 2, the HEU comprises a marshalling processor and a communication module connected to the marshalling processor. The communication module is a fifth communication mode. The marshalling processor transmits one command to the carriage control module of each carriage control unit respectively, via the fifth communication module. Upon receiving the command, the carriage control module reads the latitude and longitude data of the carriage control unit acquired by the Beidou positioning module, and transmits, to the marshalling processor and via the communication module, the read latitude and longitude data of the carriage control unit and the first-vehicle state data of the carriage control unit.

In order to determine the location of each carriage control unit, a calculation module for calculating the distance between the carriage control units is provided in the HEU.

The calculation module is realized by software programming. During the calculation of the distance between any two carriage control units, calculation is performed by the following calculation formula:

$$D=R*\arccos(\sin y1 \sin y2 + \cos y1 \cos y2 \cos(x1-x2)) \quad (1)$$

where R is the radius of the earth and has a mean value of 6370 km; the longitude and latitude of one carriage control unit are denoted by x1 and y1, respectively, and the longitude and latitude of the other carriage control unit are denoted by x2 and y2, respectively; and, the east longitude is a positive value, the west longitude is a negative value, the north latitude is a positive value, and the south latitude is a negative value.

The distance between any two carriage control units can be calculated by the above formula. Since the longitude and the latitude are angles, during the calculation of the value of sin or cos, the longitude and the latitude should be converted into radians.

In order to realize the information delivery between the HEU and the carriage control units, the fifth communication module is communicated with the first communication module, the second communication module, the third communication module and the fourth communication module via a train bus.

Figure 3:
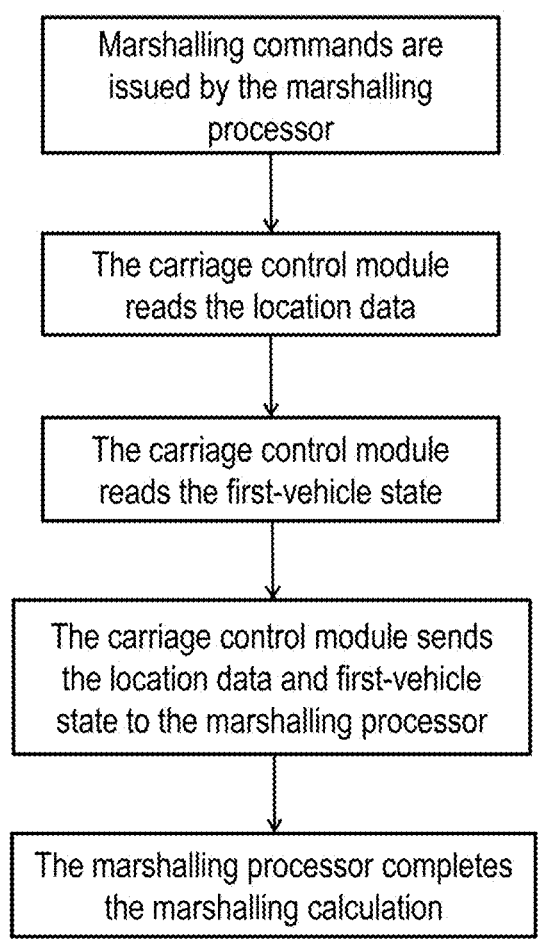
FIG. 3 is a diagram of a train marshalling process of the heavy freight train marshalling device according to Embodiment 1 of the present application.

During marshalling, referring to FIG. 3, the marshalling process transmits one marshalling command to each carriage control unit respectively, via the fifth communication module; the first carriage control module, the second carriage control module, the third carriage control module and the fourth carriage control module receives respectively, via the first communication module, the second communication module, the third communication module and the fourth communication module, the commands transmitted by the fifth communication module, and reads respectively, from the first Beidou positioning module, the second Beidou positioning module, the third Beidou positioning module and the fourth Beidou positioning module, latitude and longitude data of the first carriage control unit, the second carriage control module, the third carriage control module and the fourth carriage control module; the first carriage control module, the second carriage control module, the third carriage control module and the fourth carriage control module acquires first-vehicle state information of each carriage control unit by detecting the first-vehicle identification terminal; the location data and first-vehicle state data of each carriage control unit are transmitted to the marshalling processor via the communication module of each carriage control unit and the fifth communication module; and, the marshalling processor conducts calculation and marshalling through the received location and first-vehicle state data to complete train marshalling.

The heavy freight train marshalling device in this embodiment is applicable to the marshalling of a small-sized heavy freight train. During the mounting and application of the heavy freight train marshalling device in this embodiment, the HEU is mounted on a leading locomotive, the carriage control units are mounted on carriages, and different carriage control units are mounted on different carriages.

Embodiment 2

The structural composition and marshalling process of the heavy freight train marshalling device provided in this embodiment are similar to that in Embodiment 1. A difference between this embodiment and Embodiment 1 lies in that, in this embodiment, to realize the information delivery between the HEU and the carriage control units, the fifth communication module is communicated with the first communication module, the second communication module, the third communication module and the fourth communication module in a wireless manner, respectively. In comparison with the communication using a train bus in Embodiment 1, this embodiment does not depend on train bus and cables, and the communication mode for a heavy freight train is enriched.

During the marshalling of a train by the heavy freight train marshalling device in this embodiment, the marshalling process is the same as that in Embodiment 1.

The heavy freight train marshalling device in this embodiment is applicable to the marshalling of a small-sized heavy freight train. During the mounting and application of the heavy freight train marshalling device in this embodiment, the mounting method is the same as that in Embodiment 1.

Embodiment 3

Figure 5:
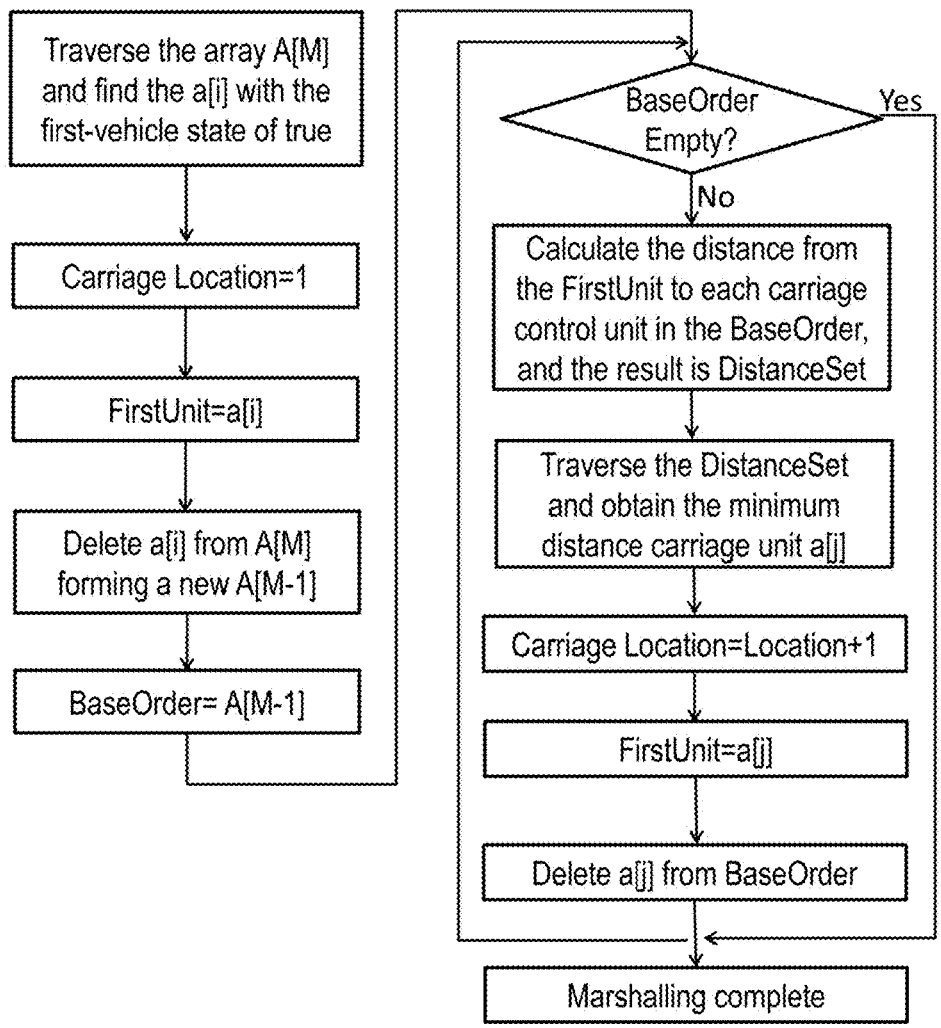
FIG. 5 is a flowchart of marshalling by a marshalling processor in a heavy freight train marshalling method according to an embodiment of the present application.

This embodiment provides a heavy freight train marshalling method, which is implemented by the heavy freight train marshalling device in Embodiment 1 or 2. Referring to FIG. 5, the heavy freight train marshalling method comprises the following steps.

(1) The total number of carriage control units is recorded as M, and M=4, the first-carriage state of the carriage control unit as the first vehicle is recorded as TRUE, and the first-carriage state of the remaining carriage control units is recorded as NULL.

(2) The marshalling processor transmits marshalling commands to all carriage control units via the fifth communication module, and the marshalling processor is switched to a train marshalling mode.

(3) The train control modules of the four carriage control units response to the marshalling commands; attitude and longitude data of each carriage control unit is acquired by the Beidou positioning module of each carriage control unit, and first-carriage state data of each carriage control unit is acquired by detecting the first-vehicle identification terminal.

(4) The four carriage control units transmit the latitude and longitude date and the first-carriage state data to the marshalling processor via the fifth communication module, forming an array A[M].

(5) The marshalling processor makes a traversal of the array A[M] to search a carriage control unit a[i] the first-vehicle state of which is TRUE; the location of the carriage control unit a[i] the first-carriage state of which is TRUE is recorded as 1; the carriage control unit a[i] is taken out from the array A[M] and stored as FirstUnit, the carriage control unit a[i] is deleted from the array A[M], and the array A[M] is rearranged to obtain an array A[M−1] which is denoted as BaseOrder.

(6) By using the FirstUnit as a starting point, the distance from the FirstUnit to each carriage control unit in the BaseOrder is calculated to form a set, donated as Distanceset; make a traversal of the Distanceset and find a carriage control unit a[j] having a minimum distance from the starting point, and the location of this carriage control unit a[j] is recorded as 2.

(7) The carriage control unit a[j] is used as a new FirstUnit, and the carriage control unit a[j] is deleted from the BaseOrder.

(8) The operations in the steps (6) and (7) are repeated to successively determine the remaining two carriage control units at locations 3 and 4, then the BaseOrder is empty, so that the marshalling of the heavy freight train is completed.

More specifically, in the step (8), by using the carriage control unit at the location 2 as a starting point, the distance from this carriage control unit and the remaining two carriage control units is calculated to find a carriage control unit having a minimum distance from this carriage control unit. If the location of the carriage control unit having the minimum distance from the carriage control unit at the location 2 is 3, the location of the last carriage control unit is 4.

The marshalling method in this embodiment is applicable for the marshalling of a small-sized heavy freight train.

Embodiment 4

This embodiment provides an electronically controlled pneumatic brake system, comprising a leading locomotive and four carriage units. Each carriage unit consists of five carriages. The electronically controlled pneumatic brake system further comprises the heavy freight train marshalling device in Embodiment 1 or 2. The HEU is provided in the leading locomotive, and one carriage control unit is provided in each carriage unit.

In this embodiment, the marshalling of a train having 20 carriages is realized.

Embodiment 5

Figure 4:
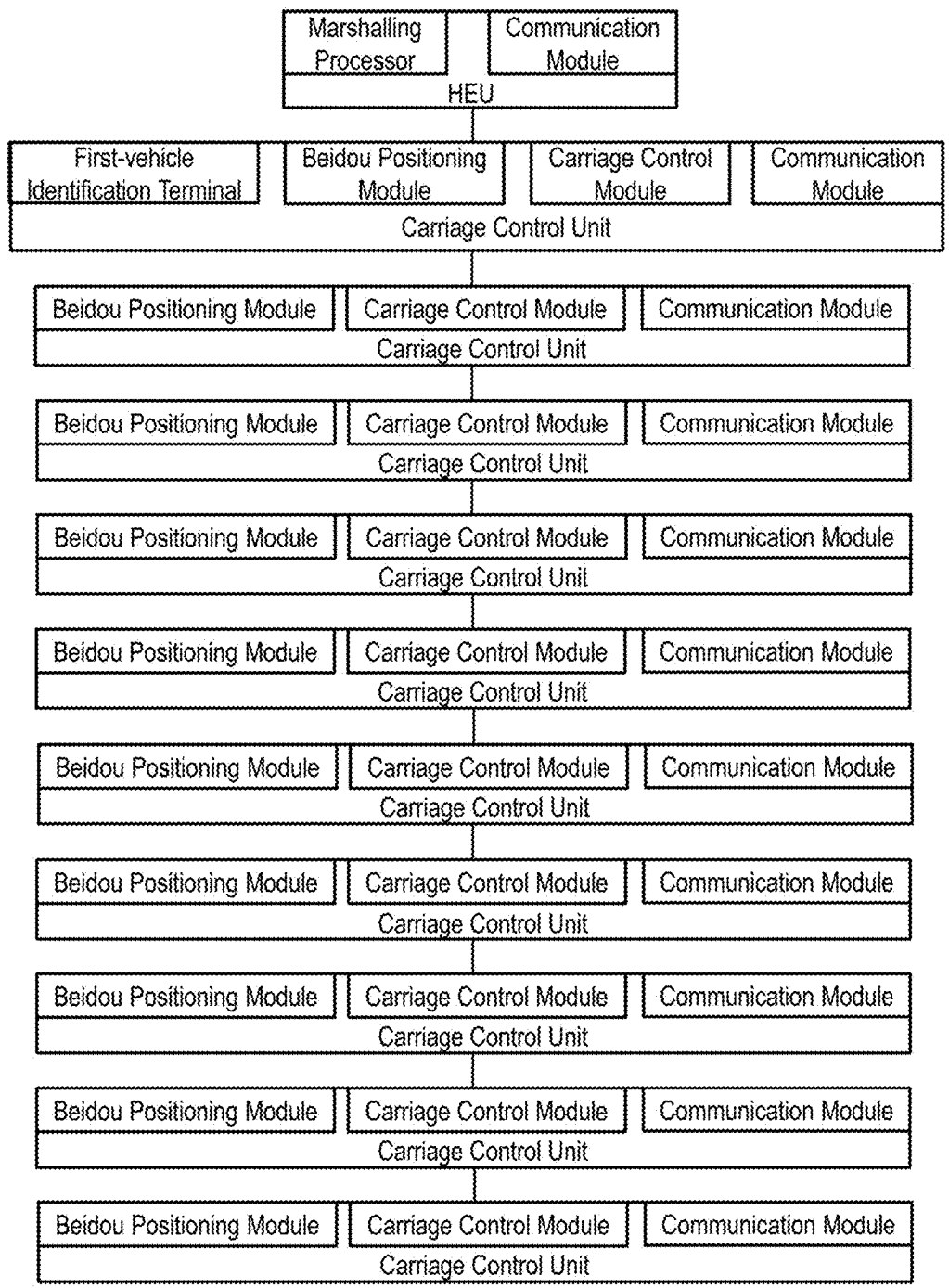
FIG. 4 is a structural diagram of a heavy freight train marshalling device according to Embodiment 5 of the present application.

Referring to FIG. 4, this embodiment provides a heavy freight train marshalling device, comprises a Head End Unit (HEU) and ten carriage control units. The HEU is communicated with each of the carriage control units, and each of the carriage control units comprises a carriage control module, a positioning module and a communication module. Each carriage control unit acquires its latitude and longitude data by the positioning module. Among the ten carriage control units, only one carriage control unit is used as a first vehicle. The first vehicle may be any one of the ten carriage control units. A first-vehicle identification terminal is further provided in the carriage control unit as the first vehicle, and the carriage control module of each carriage control unit acquires first-vehicle state data by detecting the first-vehicle identification terminal.

The HEU comprises a marshalling processor and a communication module connected to the marshalling processor. The communication module is an eleventh communication mode. The marshalling processor transmits one command to the carriage control module of each carriage control unit respectively, via the eleventh communication module. Upon receiving the command, the carriage control module reads the latitude and longitude data of the carriage control unit acquired by the positioning module, and transmits, to the marshalling processor and via the communication module, the read latitude and longitude data of the carriage control unit and the first-vehicle state data of the carriage control units.

During the marshalling of a train by the heavy freight train marshalling device in this embodiment, the marshalling process is the same as that in Embodiment 1.

The heavy freight train marshalling device in this embodiment is applicable to the marshalling of a middle-sized heavy freight train. During the mounting and application of the heavy freight train marshalling device in this embodiment, the mounting method is the same as that in Embodiment 1.

Embodiment 6

This embodiment provides a heavy freight train marshalling method, which is implemented by the heavy freight train marshalling device in Embodiment 5. Referring to FIG. 5, the heavy freight train marshalling method comprises the following steps.

(1) The total number of carriage control units is recorded as M, and M=10, the first-carriage state of the carriage control unit as the first vehicle is recorded as TRUE, and the first-carriage state of the remaining carriage control units is recorded as NULL.

(2) The marshalling processor transmits marshalling commands to all carriage control units via the eleventh communication module, and the marshalling processor is switched to a train marshalling mode.

(3) The train control modules of the ten carriage control units response to the marshalling commands; attitude and longitude data of each carriage control unit is acquired by the positioning module of each carriage control unit, and first-carriage state data of each carriage control unit is acquired by detecting the first-vehicle identification terminal.

(4) The ten carriage control units transmit the latitude and longitude date and the first-carriage state data to the marshalling processor via the eleventh communication modules, forming an array A[M].

(5) The marshalling processor traverses the array A[M] to search a carriage control a[i] unit the first-vehicle state of which is TRUE; the location of the carriage control unit a[i] the first-carriage state of which is TRUE is recorded as Location=1; the carriage control unit a[i] is removed from the array A[M] and stored as FirstUnit, the carriage control unit a[i] is deleted from the array A[M], and the array A[M] is rearranged to obtain an array A[M−1] which is denoted as BaseOrder.

(6) By using the FirstUnit as a starting point, the distance from the FirstUnit to each carriage control unit in the BaseOrder is calculated to form a set, donated as Distanceset; make a traversal of the Distanceset and find a carriage control unit a[j] having a minimum distance from the starting point, and the location of this carriage control unit a[j] is recorded as Location=Location+1, i.e. the location of the carriage control unit a[j] is 2.

(7) The carriage control unit a[j] is used as a new FirstUnit, and the carriage control unit a[j] is deleted from the BaseOrder.

(8) The operations in the steps (6) and (7) are repeated to successively determine the location of the remaining M−2 carriage control units until the BaseOrder is empty, thus the marshalling of the heavy freight train is completed.

More specifically, in the step (8), there are remaining eight carriage control units, and the operations in the steps (6) and (7) are repeated to successively determine the carriage control units at locations 3, 4, 5, 6, 7, 8, 9 and 10.

The marshalling method in this embodiment is applicable for the marshalling of a middle-sized heavy freight train.

Embodiment 7

This embodiment provides an electronically controlled pneumatic brake system, comprising a leading locomotive and ten carriage units. Each carriage unit consists of six carriages. The electronically controlled pneumatic brake system further comprises the heavy freight train marshalling device in Embodiment 5. The HEU is provided in the leading locomotive, and one carriage control unit is provided in each carriage unit.

In this embodiment, the marshalling of a train having 60 carriages is realized.

As an extension of the embodiments, the number of carriage control units in the heavy freight train marshaling device and the number of carriage units in the electronically controlled pneumatic brake system can be set at will according to the total number of carriages of the heavy freight train, and the heavy freight train marshalling device and marshalling method can realize the marshalling of different heavy freight trains and applicable to heavy freight trains of different sizes.

The foregoing embodiments are used for explaining the present application and not intended to limit the present application. Any modification and alteration made to the present application within the spirit of the present application and the protection scope of the appended claims shall fall into the protection scope of the present application.

What is claimed is:

1. A heavy freight train marshalling device, comprising a Head End Unit (HEU) and a plurality of carriage control units, wherein,
the HEU is communicated with each of the carriage control units;
each carriage control unit comprises a carriage control module, and a Beidou positioning module and a communication module respectively connected with the carriage control module;
a first-vehicle identification terminal is further provided in the carriage control unit working as a first vehicle;
the carriage control module acquires first-vehicle state data via the first-vehicle identification terminal;
the Beidou positioning module is configured to acquire latitude and longitude data of the corresponding carriage control unit; and,
the carriage control mode receives, via the communication module, a command transmitted by the HEU, and transmits, to the HEU and via the communication module, the latitude and longitude data of the carriage control unit read from the Beidou positioning module and the first-vehicle state data of the carriage control unit;
wherein a calculation module for calculating the distance between the carriage control units is provided in the HEU.

2. The heavy freight train marshalling device according to claim 1, wherein, the HEU comprises a marshalling processor and a communication module connected to the marshalling processor; the marshalling processor transmits a command to the carriage control module of each carriage control unit respectively, via the communication module; upon receiving the command, the carriage control module reads the latitude and longitude data of the carriage control unit acquired by the Beidou positioning module, and transmits, to the marshalling processor and via the communication module, the read latitude and longitude data of the carriage control unit and the first-vehicle state data of the carriage control unit.

3. The heavy freight train marshalling device according to claim 2, wherein, the calculation module is provided within the marshalling processor, and is configured to calculate the distance between each carriage control unit after the marshalling processor receives the latitude and longitude data and the first-vehicle state data of each carriage control unit.

4. The heavy freight train marshalling device according to claim 3, wherein, the marshalling processor transmits a marshalling command to the carriage control module of each carriage control unit via the communication module.

5. The heavy freight train marshalling device according to claim 4, wherein, wireless communication or wired communication is employed between the communication module of the HEU and the communication module of each carriage control unit; and wireless communication or wired communication is employed between the communication modules of the carriage control units.

6. The heavy freight train marshalling device according to claim 3, wherein, wireless communication or wired communication is employed between the communication module of the HEU and the communication module of each carriage control unit; and wireless communication or wired communication is employed between the communication modules of the carriage control units.

7. The heavy freight train marshalling device according to claim 2, wherein, the marshalling processor transmits a marshalling command to the carriage control module of each carriage control unit via the communication module.

8. The heavy freight train marshalling device according to claim 7, wherein, wireless communication or wired communication is employed between the communication module of the HEU and the communication module of each carriage control unit; and wireless communication or wired communication is employed between the communication modules of the carriage control units.

9. The heavy freight train marshalling device according to claim 2, wherein, wireless communication or wired communication is employed between the communication module of the HEU and the communication module of each carriage control unit; and wireless communication or wired communication is employed between the communication modules of the carriage control units.

10. An electronically controlled pneumatic brake system, comprising a leading locomotive and a plurality of carriage units, wherein, each carriage unit consists of at least one carriage; the electronically controlled pneumatic brake system further comprises the heavy freight train marshalling device according to claim 1; and, the HEU is provided within the leading locomotive, and the carriage control units are provided within the carriage units.

11. The electronically controlled pneumatic brake system according to claim 10, wherein, each carriage unit consists of five carriages.

12. A heavy freight train marshalling method, employing a heavy freight train marshalling device which comprises a Head End Unit (HEU) and a plurality of carriage control units, wherein, the HEU is communicated with each of the carriage control units;

each carriage control unit comprises a carriage control module, and a Beidou positioning module and a communication module respectively connected with the carriage control module;

a first-vehicle identification terminal is further provided in the carriage control unit working as a first vehicle;

the carriage control module acquires first-vehicle state data via the first-vehicle identification terminal;

the Beidou positioning module is configured to acquire latitude and longitude data of the corresponding carriage control unit and, the carriage control mode receives, via the communication module, a command transmitted by the HEU, and transmits, to the HEU and via the communication module, the latitude and longitude data of the carriage control unit read from the Beidou positioning module and the first-vehicle state data of the carriage control unit;

wherein, the method comprises the following steps of:

(1) recording the total number of carriage control units as M; the first-vehicle state of a carriage control unit as the first vehicle as TRUE, and the first-vehicle state of the remaining carriage control units as NULL;

(2) transmitting, by a Head End Unit (HEU), marshalling commands to all carriage control units via a communication unit, and switching the HEU to a train marshalling mode;

(3) responding to, for a carriage control module of each carriage control unit, the marshalling command; acquiring, by a Beidou positioning module, latitude and longitude data of the carriage control unit, and acquiring, by detecting a first-vehicle identification terminal, first-vehicle state data of the carriage control unit;

(4) transmitting, by the M carriage control units, the latitude and longitude data and the first-vehicle state data of the M carriage control units to the HEU via the communication modules, forming an array A[M];

(5) traversing, by the HEU, the array A[M] to search a carriage control unit a[i] the first-vehicle state of which is TRUE; recording the location of the carriage control unit a[i] the first-vehicle state of which is TRUE as Location=1; taking out the carriage control unit a[i] from the array A[M] and storing it as FirstUnit; deleting the carriage control unit a[i] from the array A[M]; rearranging to obtain an array A[M−1] denoted as BaseOrder;

(6) using the FirstUnit as a starting point, calculating the distance from the FirstUnit to each carriage control unit in the BaseOrder to find a carriage control unit a[i] having a minimum distance from the starting point, and recording a location of the carriage control unit a[i] as Location=Location+1;

(7) using the carriage control unit a[j] as a new FirstUnit, and deleting the carriage control unit a[i] from the BaseOrder; and (8) repeating the operations in the steps (6) and (7) to successively determine the location of the remaining M−2 carriage control units until the BaseOrder is empty, thus the marshalling of the heavy freight train is completed.

13. The heavy freight train marshalling method according to claim 12, wherein, the obtained distance from the FirstUnit to each carriage control unit in the BaseOrder forms a distance set, and the carriage control unit having the minimum distance from the starting point is searched from the distance set.

* * * * *